US012243186B2

(12) United States Patent
Byun (10) Patent No.: US 12,243,186 B2
(45) Date of Patent: Mar. 4, 2025

(54) DISPLAY DEVICE AND OPERATING METHOD THEREOF (71) Applicant: Samsung Electronics Co., Ltd., Suwon-si (KR)

(72) Inventor: Jeongmoon Byun, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 18/457,655

(22) Filed: Aug. 29, 2023

(65) Prior Publication Data
US 2024/0212091 A1  Jun. 27, 2024

(30) Foreign Application Priority Data
Dec. 26, 2022 (KR) .......... 10-2022-0185059

(51) Int. Cl.
G06T 3/40 (2024.01)
G06F 3/01 (2006.01)
G06T 5/50 (2006.01)

(52) U.S. Cl.
CPC .............. G06T 3/40 (2013.01); G06F 3/013 (2013.01); G06T 5/50 (2013.01); G06T 2207/20212 (2013.01)

(58) Field of Classification Search
CPC .. G06T 3/40; G06T 3/013; G06T 5/50; G06T 2207/20212
USPC .......................................................... 345/156
See application file for complete search history.

(56) References Cited

U.S. PATENT DOCUMENTS

| 8,345,749 | B2 | 1/2013 | Quast et al. |
| 10,169,846 | B2 | 1/2019 | Stafford et al. |
| 11,010,956 | B2 | 5/2021 | Blackmon et al. |
| 11,106,039 | B2 | 8/2021 | Riguer et al. |
| 11,451,788 | B2 | 9/2022 | Pan et al. |
| 2016/0044294 | A1* | 2/2016 | Friedman ......... H04N 21/44008 348/587 |
| 2016/0353146 | A1 | 12/2016 | Weaver et al. |
| 2018/0262758 | A1 | 9/2018 | El-Ghoroury et al. |
| 2019/0339770 | A1* | 11/2019 | Kurlethimar ........ G02B 27/017 |
| 2020/0167999 | A1* | 5/2020 | Schmit .................... G06F 3/013 |
| 2020/0366899 | A1 | 11/2020 | Fitzgerald et al. |
| 2020/0402214 | A1* | 12/2020 | Mukherjee ................ G06T 7/11 |
| 2021/0096644 | A1* | 4/2021 | Wang ..................... H04N 19/17 |
| 2021/0134250 | A1* | 5/2021 | Choi .................. G02B 27/0093 |
| 2021/0141449 | A1* | 5/2021 | Zhang .................... G06F 3/013 |
| 2021/0166341 | A1* | 6/2021 | Bastani .................. G06T 11/00 |

(Continued)

Primary Examiner — Tom V Sheng
(74) Attorney, Agent, or Firm — Harness, Dickey & Pierce, P.L.C.

(57) ABSTRACT

According to at least one example embodiment, a display device includes at least one sensor, and processing circuitry, wherein the processing circuitry may be configured to generate a first image based on a gaze region of a user tracked using the at least one sensor, generate a second image based on a desired section of a background image, the desired section corresponding to the user's gaze region on the background image, obtain residual data from the first image and the second image, the obtaining the residual data including subtracting pixel values of the first image from pixel values of the second image, and generate a third image based on the residual data, the generating the third image including performing filtering of the residual data by applying at least one desired weight to the residual data.

20 Claims, 9 Drawing Sheets

(56) References Cited

U.S. PATENT DOCUMENTS

| | | |
|---|---|---|
| 2021/0195212 A1 | 6/2021 | Atluru et al. |
| 2021/0217179 A1* | 7/2021 | Li .......................... G06T 7/11 |
| 2021/0350510 A1* | 11/2021 | Gomez Diaz ........ G02B 27/286 |
| 2022/0014740 A1* | 1/2022 | Baran .................. H04N 19/176 |
| 2022/0269340 A1 | 8/2022 | Hirvonen et al. |
| 2023/0108159 A1* | 4/2023 | Park ...................... H10K 59/65 |
| | | 345/204 |
| 2023/0259199 A1* | 8/2023 | Chang .................... G06F 3/011 |
| | | 345/156 |

* cited by examiner

DISPLAY DEVICE AND OPERATING METHOD THEREOF

CROSS-REFERENCE TO RELATED APPLICATION

This U.S. non-provisional application claims the benefit of priority under 35 U.S.C. § 119 to Korean Patent Application No. 10-2022-0185059, filed on Dec. 26, 2022, in the Korean Intellectual Property Office, the disclosure of which is incorporated by reference herein in its entirety.

BACKGROUND

Various example embodiments of the inventive concepts relate to a display device, a system including the display device, and/or a method of operating the display device, etc. More particularly, one or more of the example embodiments relate to a display device including at least one processor and a timing controller used to generate a foveated image, etc.

With the recent development of technology, various types of wearable display devices that may be worn on the body have emerged. Among various types of wearable display devices, an extended reality (XR) glass device is a head-mounted (HMD) wearable device which is worn on a user's head, and may provide an XR service to the user by providing visual information through a display.

Conventional XR glass devices may provide a foveated image to a user in order to improve graphic performance of a displayed image. The foveated image is created by tracking the gaze of a user receiving and/or viewing an XR service, and mixing an image implemented in high resolution corresponding to a user's gaze region with another image implemented in low resolution corresponding to a background region. However, when creating the foveated image, as the image of the user's gaze region and the image of the background region with different resolutions are mixed, excessive processing power and/or electrical power are consumed by, for example, a graphics processing unit (GPU) of the conventional XR glass device, and/or graphics data throughput exceeding a desired value and/or a reference value is generated, which may cause performance degradation in the function performance of the display device.

SUMMARY

Various example embodiments of the inventive concepts provide a display device capable of reducing the amount of data processing and/or power consumed during the process of generating a foveated image, etc.

According to at least one example embodiment of the inventive concepts, there is provided a display device including at least one sensor, and processing circuitry, wherein the processing circuitry is configured to generate a first image based on a gaze region of a user tracked using the at least one sensor, generate a second image based on a desired section of a background image, the desired section corresponding to the user's gaze region on the background image, obtain residual data from the first image and the second image, the obtaining the residual data including subtracting pixel values of the first image from pixel values of the second image, and generate a third image based on the residual data, the generating the third image including performing filtering of the residual data by applying at least one desired weight to the residual data.

According to at least one example embodiment of the inventive concepts, there is provided a method of operating a display device including tracking, by processing circuitry, tracking, by processing circuitry, a user's gaze region, generating, by the processing circuitry, a first image corresponding to the user's gaze region, the first image having a first resolution, generating, by the processing circuitry, a second image based on a desired section of a background image, the desired section corresponding to the user's gaze region on the background image, the second image having a second resolution, obtaining, by the processing circuitry, residual data from the first image and the second image, the obtaining including subtracting pixel values of the first image from pixel values of the second image, and generating, by the processing circuitry, a third image based on the residual data, the generating the third image including performing filtering of the residual data by applying at least one desired weight to the residual data.

According to at least one example embodiment of the inventive concepts, there is provided a wearable electronic device including processing circuitry configured to identify a user's region of interest in an image displayed to the user, generate a first image corresponding to the region of interest, generate a second image based on a desired section of a background image, the desired section corresponding to the user's region of interest on the background image, generate a third image based on residual data, the residual data generated by filtering pixel values of the first image and pixel values of the second image, and generate an output image based on the background image and the third image.

BRIEF DESCRIPTION OF THE DRAWINGS

Various example embodiments of the inventive concepts will be more clearly understood from the following detailed description taken in conjunction with the accompanying drawings in which.

DETAILED DESCRIPTION

Although various example embodiments of the inventive concepts are described with reference to the accompanying drawings, a person of ordinary skill in the art to which the inventive concepts pertain are able to understand that the example embodiments of the inventive concepts may be embodied in other specific forms without changing their technical ideas and/or essential features. Therefore, it should be understood that the example embodiments described below are illustrative in all respects and not restrictive.

Hereinafter, various example embodiments of the inventive concepts are described in detail with reference to the accompanying drawings.

Figure 1:
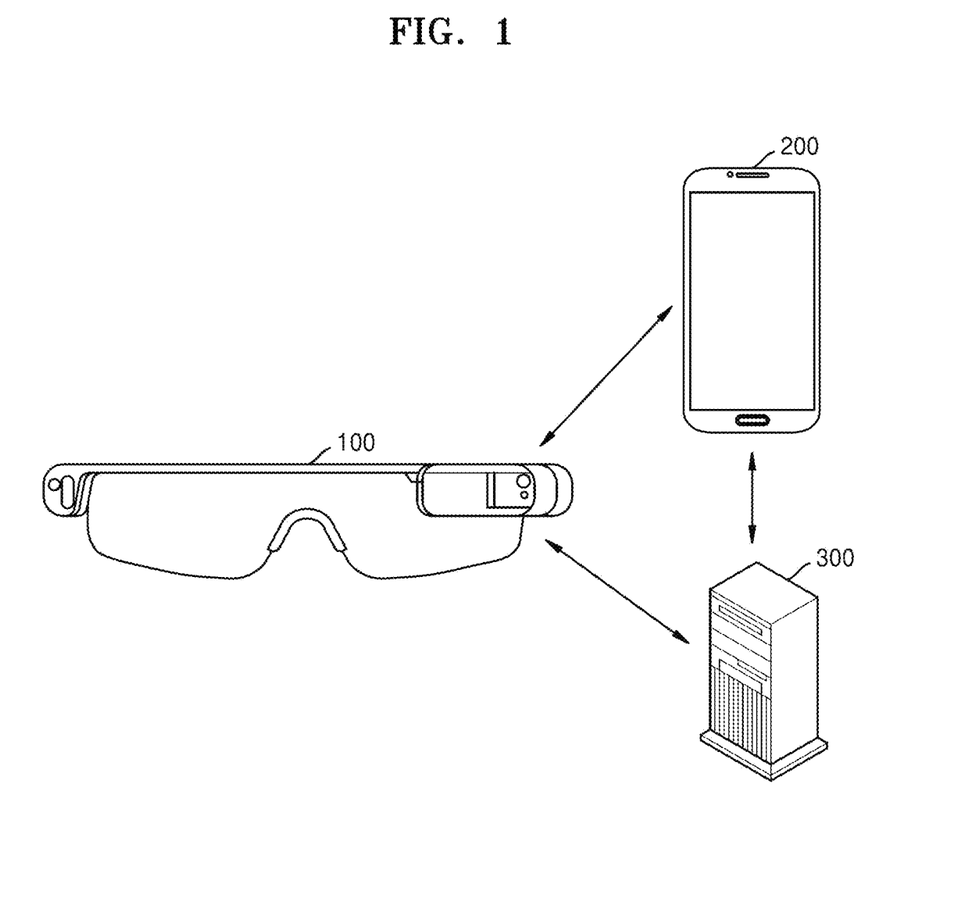
FIG. 1 is a diagram for explaining a display system according to at least one example embodiment.

FIG. 1 is a diagram for explaining a display system according to at least one example embodiment.

Referring to FIG. 1, the display system according to at least one example embodiment may include a display device (e.g., wearable glasses) 100, a mobile terminal 200 (and/or a user terminal, etc.), and/or a server 300, etc., but the example embodiments are not limited thereto. According to at least one example embodiment, the display device 100 may include a wearable display device. However, the example embodiments are not limited thereto, and for example, the display system may be implemented with more components than those shown in FIG. 1, and/or the display system may be implemented with fewer components than those shown in FIG. 1. For example, the display system may be implemented by the display device 100 and the mobile terminal 200 without the server 300, and/or by the display device 100 and the server 300 without the mobile terminal 200, etc.

The display device 100 may be communicatively connected to the mobile terminal 200 and/or the server 300. For example, the display device 100 may perform short-range communication with the mobile terminal 200, but is not limited thereto, and for example, may be connected to the mobile terminal 200 via a wired connection, e.g., USB, Ethernet, etc. Examples of short-range communication may include wireless LAN (e.g., Wi-Fi), near field communication (NFC), Bluetooth, Bluetooth low energy (BLE), ZigBee, Wi-Fi direct (WFD), ultra-wideband (UWB), and the like, but are not limited thereto. On the other hand, the display device 100 may be connected to the server 300 through wireless communication (e.g., mobile communications, cellular communications, 4G LTE, 5G NR, 6G, etc.) and/or wired communication (e.g., wired LAN, etc.).

The mobile terminal 200 may transmit data to the display device 100 and/or receive data from the display device 100, but is not limited thereto. For example, the mobile terminal 200 may transmit a user's region of interest (e.g., the user's gaze region) tracking message and/or a control command related to foveated image generation to the display device 100, etc.

On the other hand, the mobile terminal 200 (e.g., user terminal, user device, etc.) may be implemented in various forms. For example, the mobile terminal 200 described in at least one example embodiment may include a mobile phone, a smart phone, a tablet, a laptop computer, a personal computer (PC), an e-book terminal, a digital broadcasting terminal, a personal digital assistant (PDA), a portable multimedia player (PMP), a personal navigation device, an MP3 player, a digital camera, a television, a gaming console, an Internet of Things (IoT) device, any other smart devices, and the like, but is not limited thereto.

The server 300 may be, for example, a cloud server which manages the display device 100, but the example embodiments are not limited thereto. In addition, the server 300 may be a content provider which provides the user's region of interest (e.g., the user's gaze region) tracking message and/or a foveated image-generating message, etc.

In at least one example embodiment, the server 300 may include an intelligence engine (e.g., an artificial intelligence engine, a machine learning engine, a neural network, etc.), and may analyze the user's gaze pattern (state) and/or the user's movement pattern (state) through the intelligence engine to extract the user's region of interest (and/or the user's gaze region), etc. In addition to the server 300, the user's region of interest (or the user's gaze region) may be analyzed by the display device 100 itself and/or the mobile terminal 200 connected to the display device 100 for short-range communication and/or communicatively connected to the display device 100, etc.

In addition, the user's region of interest (and/or the user's gaze region) extracted based on the gaze pattern (e.g., state, etc.) analyzed by the server 300 may be directly transmitted to the display device 100 and/or transmitted to the display device 100 through the mobile terminal 200 connected to the display device 100 for short-range communication and/or communicatively connected to the display device 100, etc., but the example embodiments are not limited thereto.

Hereinafter, a method of generating a foveated image based on the user's region of interest (and/or the user's gaze region) by the display device 100 is described in detail with reference to FIGS. 3 to 7.

Figure 2:
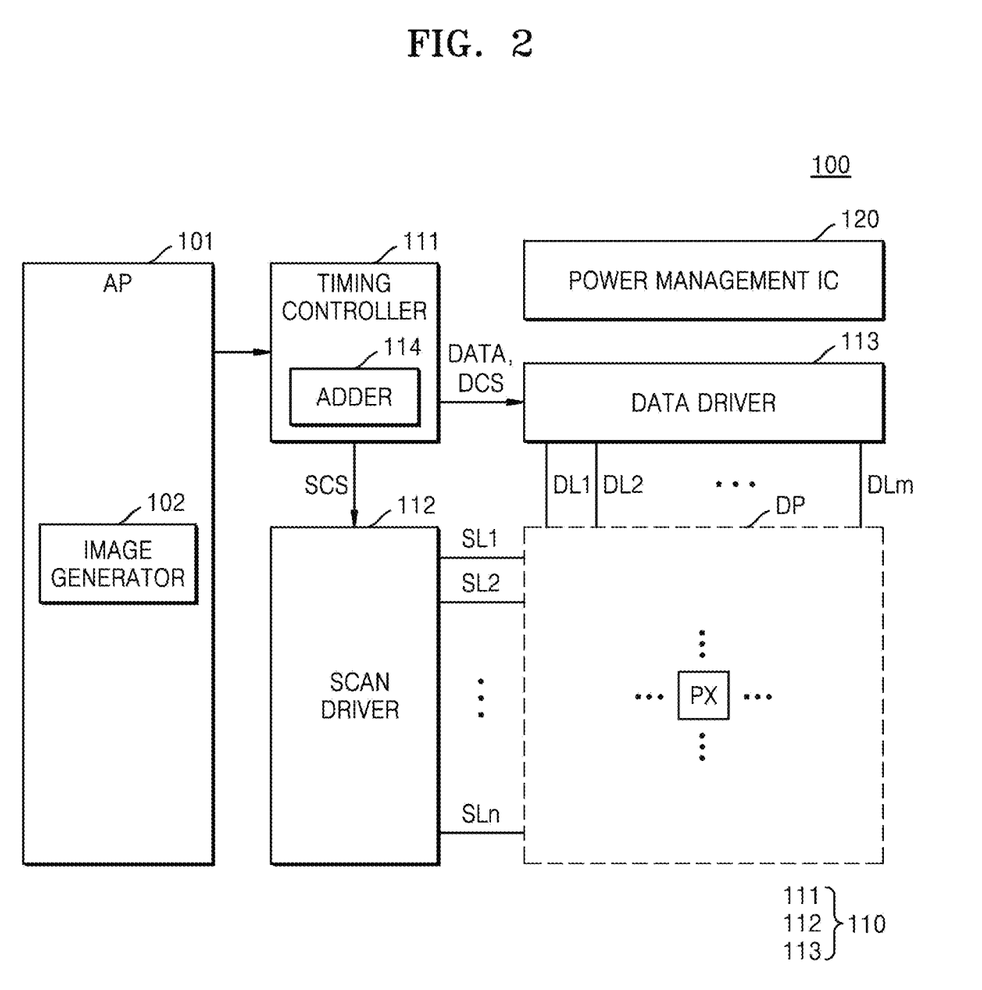
FIG. 2 is a block diagram illustrating a display device according to at least one example embodiment.

FIG. 2 is a block diagram illustrating a display device according to at least one example embodiment.

Referring to FIG. 2, a display device 100 according to the inventive concepts may include an application processor AP (hereinafter, referred to as a processor) 101, a display panel DP including a plurality of pixels PX, a timing controller 111, a scan driver 112, a data driver 113, and/or a power management IC 120 (PMIC), etc., but the example embodiments are not limited thereto, and for example, the display device 100 may include a greater or lesser number of constituent components. According to at least one example embodiment, the display device 100 may include a wearable display device (e.g., wearable glasses), but is not limited thereto. According to some example embodiments, the processor 101, the timing controller 111, the scan driver 112, the data driver 113, and/or the PMIC 120 may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

In at least one example embodiment, the processor AP 101 may identify the user's gaze region by tracking the gaze of the user. The user's gaze region is at least one region where the user's gaze stays and/or is focused upon among a plurality of regions included in the display panel DP, and may also be referred to as a user's region of interest. The processor AP 101 may track the user's gaze region (and/or the user's region of interest, etc.) using at least one sensor, and may generate and/or may process at least one image based on the tracked user's gaze region, etc.

In at least one example embodiment, the processor AP 101 may include an image generator 102 which generates and/or processes a user's region of interest (ROI) image (hereinafter referred to as an ROI image), etc. The image generator 102 may generate at least one first image of a first resolution as the ROI image and at least one second image of a second resolution as a background image, based on the gaze region of the user, but is not limited thereto. In this case, the second resolution of the second image may be lower than the first resolution of the first image. The image generator 102 may generate a third image by applying a filter to obtain a difference value data by subtracting pixel values of the first image from pixel values of the second image, but the example embodiments are not limited thereto, and for example, there may be two or more third images, etc. The image generator 102 may transmit the background image and the third image to the timing controller 111, but is not limited thereto.

In at least one example embodiment, the timing controller 111 may provide the data driver 113 with a data value DATA and/or a data control signal DCS for each frame (e.g., image frame, etc.).

In at least one example embodiment, the timing controller 111 may provide a clock signal, a scan control signal (SCS), and/or the like, to the scan driver 112, etc.

In at least one example embodiment, the timing controller 111 may include an adder 114, but is not limited thereto. The timing controller 111 may generate an output image by receiving a background image and/or the third image from the processor AP 101, scaling up the background image (e.g., increasing a size and/or resolution of the background image, etc.) by a desired and/or predetermined magnification factor (e.g., a magnification value, etc.), and mixing the scaled-up background image with the third image using an adder 114, etc., but the example embodiments are not limited thereto.

In at least one example embodiment, the data driver 113 may generate data voltages to be provided to the plurality of data lines DL1 to DLm using the data value DATA and/or the data control signal DCS received from the timing controller 111, etc. Here, m is a natural number.

In at least one example embodiment, the scan driver 112 may receive the scan control signal SCS (including a clock signal and/or a scan start signal, etc.) from the timing controller 111 and may generate scan signals to be provided to the scan lines SL1 to SLn. Here, n is a natural number and may be the same or different than the value of m.

In at least one example embodiment, the display panel DP may include a light-receiving layer, a light emitting layer, and/or a transparent layer, etc., stacked in a vertical direction, but the example embodiments are not limited thereto. Here, the light-receiving layer may include at least one photodetector for measuring a reflection pattern, and the light-emitting layer may include a plurality of pixels PX disposed on the light-receiving layer, but is not limited thereto. The transparent layer may be disposed on the light-emitting layer in the display panel DP and may be made of a stretchable material, but the example embodiments are not limited thereto.

In at least one example embodiment, the display panel DP includes a plurality of pixels (e.g., a plurality of self-light emitting elements) PX. The plurality of pixels PX may be connected to corresponding data lines and scan lines, respectively.

In at least one example embodiment, each of the plurality of pixels PX may be a red pixel emitting red light, a blue pixel emitting blue light, and/or a green pixel emitting green light, but the example embodiments are not limited thereto. In another example, the plurality of pixels PX may include white, cyan, magenta, and yellow pixels instead of red, green, and blue pixels, etc.

In at least one example embodiment, a circuit (e.g., processing circuitry, etc.) including at least one of the timing controller 111, the scan driver 112, and the data driver 113 may be referred to as a display driving IC (DDI) 110.

In at least one example embodiment, the display driving circuit 110 may be provided as an integrated circuit and/or processing circuitry.

In at least one example embodiment, the power management circuit 120 may receive an external power source (e.g., battery power from a battery included in the display device 100, power from a battery separate from the display device 100, power from a power outlet, etc.). In one example, the power management circuit 120 may generate a voltage and/or current to be supplied to the display driving circuit 110 based on the external input voltage and/or external input current, etc.

In at least one example embodiment, the power management circuit 120 may generate a voltage to be provided to the timing controller 111 and/or the processor AP 101 of the display driving circuit 110, but is not limited thereto. The power management circuit 120 may generate a voltage for generating a foveated image and may provide the voltage to the timing controller 111 and/or the processor AP 101, but the example embodiments are not limited thereto.

In at least one example embodiment, the power management circuit 120 may include at least one regulator, but is not limited thereto. In one example, the at least one regulator may generate output voltages having various voltage levels from a voltage supplied from an external power source, etc. In one example, the at least one regulator may be formed as a controller and/or disposed within a controller, but is not limited thereto. In one example, the at least one regulator may include a buck-converter, but is not limited thereto. For example, the at least one regulator may include at least one of a buck-boost converter, a boost converter, and a cuk converter, etc., but is not limited thereto.

A method of generating a foveated image of the display device 100 according to at least one example embodiment is described with reference to FIG. 3.

Figure 3:
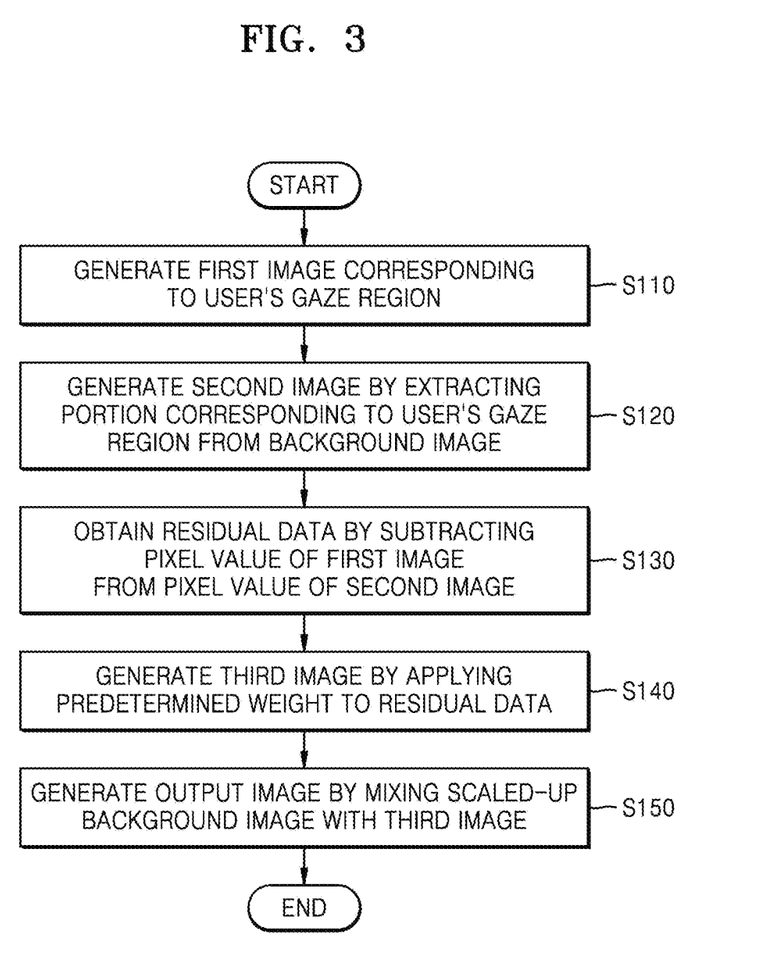
FIG. 3 is a flowchart illustrating a method of operating a display device, according to at least one example embodiment.

FIG. 3 is a flowchart illustrating a method of operating a display device, according to at least one example embodiment.

In detail, FIG. 3 is a diagram for explaining a method of generating a foveated image of the display device 100 of FIG. 2, but the example embodiments are not limited thereto. In at least one example embodiment, the display device 100 may include a wearable display device (e.g., wearable glasses), but is not limited thereto.

Referring to FIG. 3, an operation of generating the foveated image by the processor AP 101 and the timing controller 111 of the display device 100 of FIG. 2 may include operations S110, S120, S130, S140, and S150, but the example embodiments are not limited thereto, and for example, one or more of the operations may be combined, omitted, rearranged, etc.

In operation S110, the display device 100 may generate at least one first image corresponding to the user's gaze region. Here, the user's gaze region is a region where the user's gaze stays among a plurality of regions included in the display panel of the display device 100, and may also be referred to as a user's ROI. The processor AP 101 of the display device 100 may identify and/or track the user's gaze using at least one sensor, identify and/or determine the user's gaze region, and generate a first image corresponding to the user's gaze region at a first resolution, but is not limited thereto.

In operation S120, the display device 100 may generate at least one second image by extracting at least one portion (e.g., section, area, etc.) corresponding to the user's gaze region from the background image. The processor AP 101 of the display device 100 extracts at least one portion corresponding to the user's gaze region from the background image, and may generate at least one second image by scaling up (e.g., increasing) the size of the extracted portion to be the same as the size of the first image, but the example embodiments are not limited thereto. For example, the second image may be generated with a second resolution that is lower than the first resolution of the first image, etc.

In operation S130, the display device 100 may obtain residual data by subtracting the pixel value (e.g., pixel color values corresponding to individual pixels included in the first image, an average pixel color value of the pixels included in the first image, etc.) of the first image from the pixel value (e.g., pixel color values corresponding to individual pixels included in the second image, an average pixel color value of the pixels included in the second image, etc.) of the second image. For example, when the pixel value of the second image is '120' at a particular pixel position of the second image and the pixel value of the first image is '100' at the same particular pixel position in the first image, the residual data may be '−20'. In another example, when the average pixel value of the second image is '130' and the average pixel value of the first image is '170', the average difference value data may be '+40', etc.

In operation S140, the display device 100 may generate at least one third image by applying a desired and/or predetermined weight to the residual data. The weight may be determined (and/or previously determined) based on a shape of a boundary area of the third image mixed with the background image, or in other words, the boundary area may cover an area where the third image and the background image overlap, etc. The processor AP 101 of the display device 100 may transmit, to the timing controller 111, the third image and the background image generated through at least one filtering operation which applies the desired and/or predetermined weight to the residual data, etc. An operation of generating at least one third image by the processor AP 101 of the display device 100 is described in detail in FIG. 4 described below.

Figure 5:
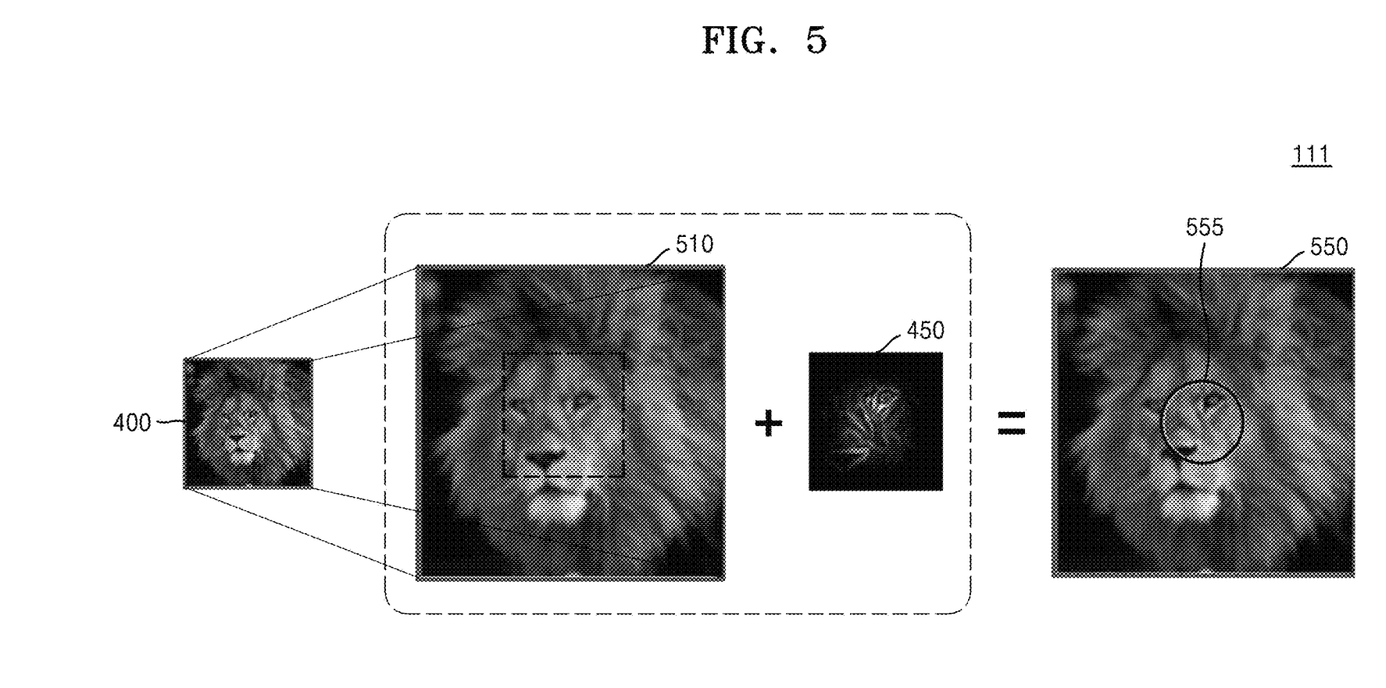
FIG. 5 is a diagram for explaining an operation of mixing an image of a background area with an image of a user's gaze region according to at least one example embodiment.

In operation S150, the display device 100 may generate at least one output image by mixing the scaled-up background image with the third image. The timing controller 111 of the display device 100 may generate the at least one output image by performing, for example, an add operation on the received background image and the third image, etc., but the example embodiments are not limited thereto. In FIG. 5 described below, a mixing operation between the background image and the third image by the timing controller 111 of the display device 100 is described in detail.

Figure 4:
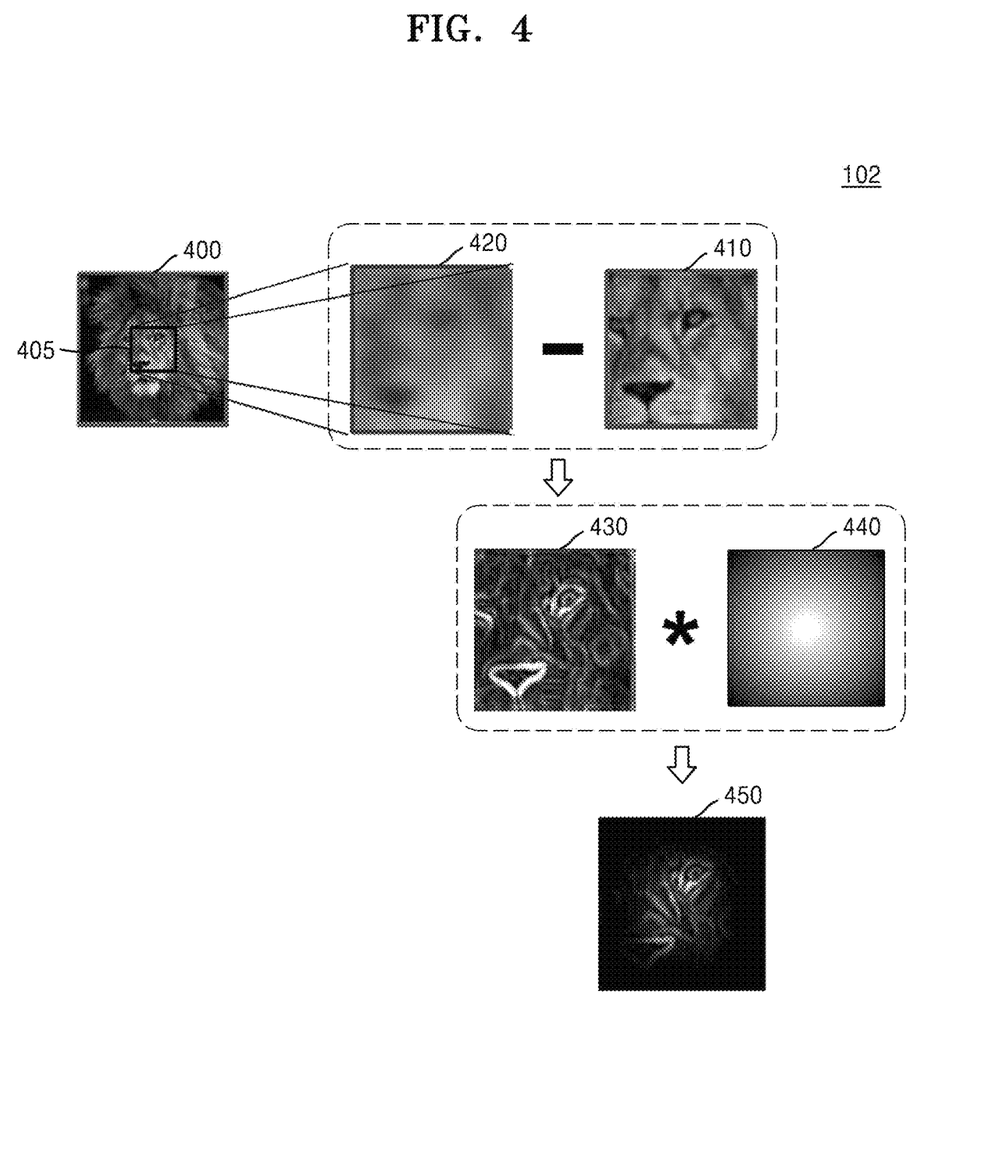
FIG. 4 is a diagram for explaining an operation of extracting a high frequency component from an image of a user's gaze region according to at least one example embodiment.

FIG. 4 is a diagram for explaining an operation of extracting a high frequency component from an image of a user's gaze region according to at least one example embodiment.

In detail, in operation S140 of FIG. 3, an operation of generating at least one third image by extracting and filtering high-frequency components from an image of a user's gaze region by the image generator 102 of the processor AP 101 is described. In at least one example embodiment, the display device 100 may include a wearable display device (e.g., wearable glasses), but is not limited thereto.

Referring to FIG. 4, in at least one example embodiment, the image generator 102 of the processor AP 101 may generate at least one first image 410 that captures and/or corresponds to the ROI image of the user based on the user's gaze region, etc. In this case, the first image 410 may be generated with a first resolution. The user's gaze region is a region where the user's gaze stays among a plurality of regions included in the display panel, and may refer to and/or correspond to a user's interest region, etc.

In at least one example embodiment, the image generator 102 may generate the at least one second image 420 by extracting and scaling up (e.g., increasing) a portion 405 corresponding to the user's gaze region from the background image 400. In this case, the second image 420 may be generated with the same second resolution as the resolution of the background image 400, and the second resolution may be a comparatively lower resolution than the first resolution of the first image, but the example embodiments are not limited thereto, and for example, the second resolution may be the same as the first resolution, etc.

In at least one example embodiment, the image generator 102 may obtain residual data 430 based on the first image 410 and the second image 420, by for example, subtracting pixel values included in the first image 410 from pixel values included in the second image 420, etc. The residual data is obtained by subtracting a pixel value of the first image 410 having a relatively high resolution (e.g., the first resolution) from a pixel value of the second image 420 having a relatively low resolution (e.g., the second resolution), but is not limited thereto. Accordingly, the residual data may include at least one high frequency component (e.g., high resolution components, etc.) of the first image 410 by removing at least one low frequency component (e.g., the low resolution components, etc.) from one or more frequency components of the first image 410 that are included in the user's gaze region image (e.g., the ROI image of the user), etc.

In at least one example embodiment, the image generator 102 may generate the third image 450 by applying the filter 440 to the residual data 430 (or in other words, filtering the residual data 430, etc.). For example, the image generator 102 may generate the third image 450 by applying at least one weight determined based on a shape of a boundary area including the background image 400 and the third image 450 (e.g., the boundary area may be an area wherein the background image 400 and the third image 450 overlap, coincide, etc.) and the residual data 430. More specifically, the image generator 102 may process the residual data 430 based on the shape of a desired and/or preset boundary area in which the background image 400 and the third image 450 are mixed with each other through a filter 440, etc. Here, the filter 440 may be configured to apply the same desired weight within a desired threshold distance away from the tracked user's gaze as the origin, and to apply a weight of greater value (and/or increasing value) as the distance to the tracked user's gaze and/or the user's gaze region becomes closer, but the example embodiments are not limited thereto. In other words, the filter 440 applies a greater weight to regions and/or areas of the residual data 430 which are closer to the user's ROI, and applies a lesser weight to regions and/or areas of the residual data 430 which are further away from the user's ROI but less than a desired threshold distance, and then applies a uniform threshold weight to areas and/or regions of the residual data 430 which exceed the threshold distance, etc.

In at least one example embodiment, for example, when a pixel value of the second image 420 is '123', a pixel value of the first image 410 corresponding to a pixel of the second image 420 is '107', and the weight corresponding to the pixel of the second image 420 is '0.1', the image generator 102 obtains residual data '−16' between the pixel value '107' of the first image 410 and the pixel value '123' of the second image 420, and then may calculate a pixel value of '−1.6' of the third image 450 corresponding to filtering in which the weight '0.1' is applied to the obtained residual data '−16', but the example embodiments are not limited thereto.

In at least one example embodiment, the processor AP 101 may transmit the background image 400 and the third image 450 to the timing controller 111 to generate a foveated image, but the example embodiments are not limited thereto. The image generator 102 may transmit the background image 400 including low-frequency components of the entire image including the user's gaze region (e.g., the user's ROI) and a third image 450 including high-frequency components of the first image corresponding to the user's gaze region, etc.

In the case of the display device according to the comparison example of the inventive concepts, there is a problem wherein data overflow and/or excessive power consumption occur as the background image 400 and the user's ROI image are both transmitted in their entireties to generate the foveated image. In the case of the display device according to at least one example embodiment, as the high frequency component of the first image, which is the user's ROI (e.g., the user's gaze region) image, is filtered and transmitted as the third image 450, the amount of data being transmitted is reduced, the amount of graphical processing is correspondingly reduced, and therefore the power consumption is reduced, thereby improving the overall performance of the display device, etc.

In addition, in the case of the display device according to the comparative example to the example embodiments of the inventive concepts, the shape of the boundary area including the background image 400 and the third image 450 is limited due to implementation limitations, but in the case of a display device according to at least one example embodiment, by using a filter using a plurality of weights on the residual data, it is possible to implement boundary areas of various shapes based on display use environments and/or display functions, etc.

FIG. 5 is a diagram for explaining an operation of mixing an image of a background area with an image of a user's gaze region according to at least one example embodiment.

In detail, in operation S150 of FIG. 3, an operation of mixing the background image 400 with the third image 450 by the timing controller 111 of the display device 100 is described, but the example embodiments are not limited thereto. In at least one example embodiment, the display device 100 may include a wearable display device (e.g., wearable glasses), but the example embodiments are not limited thereto.

Referring to FIG. 5, in at least one example embodiment, the timing controller 111 may receive the background image 400 and the third image 450 from the processor AP 101, but is not limited thereto.

In at least one example embodiment, the timing controller 111 may generate a scaled-up background image 510 based on the original background image 400 at a desired and/or predetermined magnification using, for example, a scaler, etc. Here, the desired and/or predetermined magnification may be determined based on the output resolution of the display device, but is not limited thereto, and for example, may be configured by a user, the display device manufacturer, a software developer, etc.

In at least one example embodiment, the timing controller 111 may generate an output image 550 by adding the scaled-up background image 510 to the third image 450 using, for example, an adder 114, but the example embodiments are not limited thereto. As the scaled-up background image 510 includes low-frequency components of the entire image including the user's gaze region (e.g., the user's ROI), and the third image 450 includes high-frequency components of the first image corresponding to the user's gaze region, the timing controller 111 may generate the output image (e.g., the foveated image) 550 through an addition operation between the scaled-up background image 510 and the third image 450, etc. In the case of the user's gaze region 555 corresponding to the third image 450 in the output image 550, at least one high-frequency component of the third image 450 may be added to at least one low-frequency component of the background image 400 and may be output as a relatively high-resolution image in relation to the background image 400, etc. The rest of the output image 550, except for the user's gaze region 555, may be composed of only low-frequency components of the background image 400 and may be output as a low-resolution image, etc.

In the case of a display device according to a comparative example to the example embodiments of the inventive concepts, additional hardware configuration(s) (e.g., mixer, shaper, alpha blender, etc.) and/or additional calculation process(es) are further required for mixing the background image and the user gaze region (e.g., user's ROI) image, and additional data is required for providing the mixing ratio of the two images for mixing between a background image having a different resolution and an image of the user's gaze region, etc. However, in the case of the display device according to at least one example embodiment, the foveated image may be generated without a separate hardware configuration and/or additional calculation process by generating the foveated image through an addition operation between a background image 510 including low-frequency components of the entire image including the user's gaze region and a third image 450 including high-frequency components of the user's gaze region image, etc.

Figure 6:
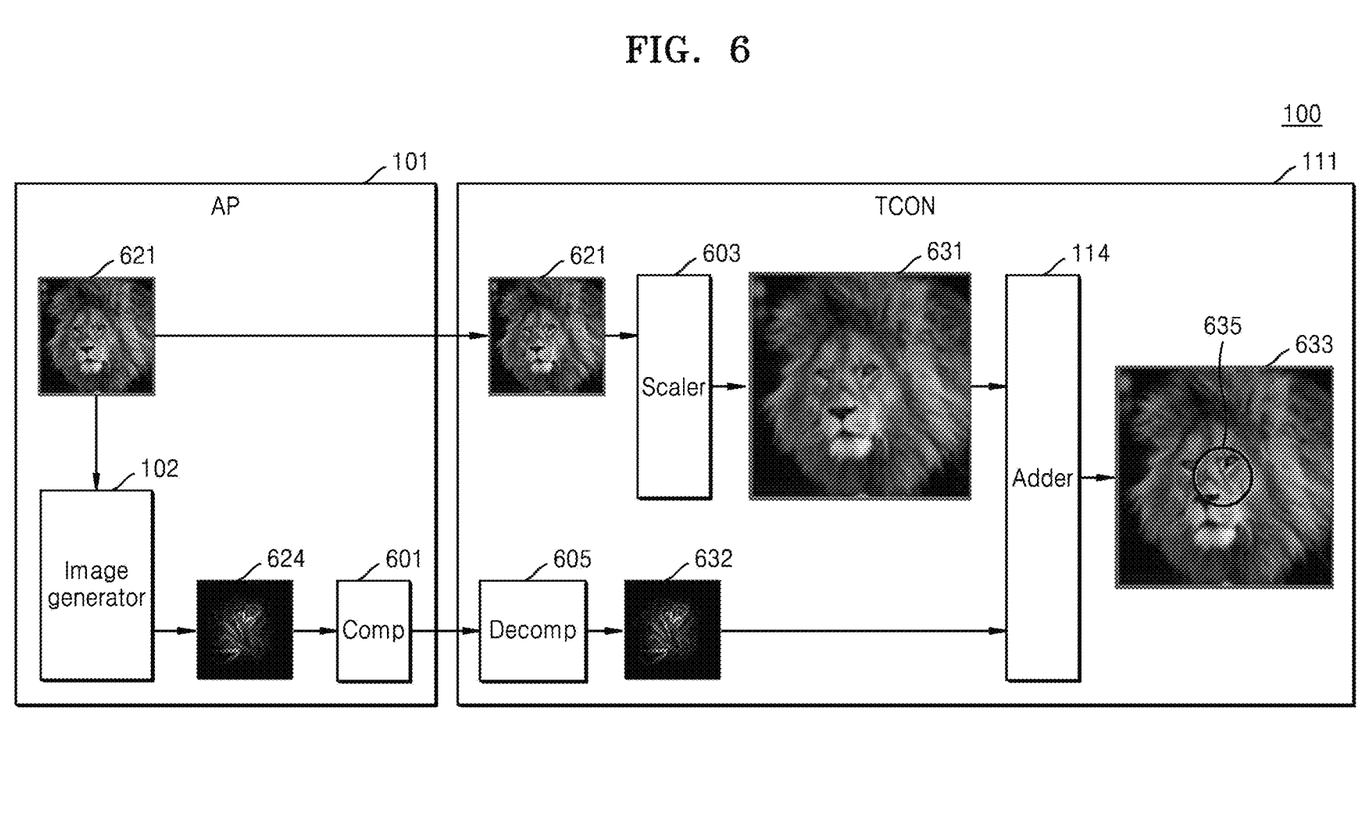
FIG. 6 is a diagram for explaining an operation of generating a foveated image according to at least one example embodiment.

FIG. 6 is a diagram for explaining an operation of generating a foveated image according to at least one example embodiment.

In detail, at least one example embodiment for reducing the amount of data transmission and power consumption generated when generating the foveated image based on the processor AP 101 and the timing controller 111 of the display device 100 of FIG. 2 is described, but the example embodiments are not limited thereto.

Referring to FIG. 6, the processor AP 101 may include an image generator 102 and/or an image compression circuit Comp 601, etc., but the example embodiments are not limited thereto.

In at least one example embodiment, the processor AP 101 may track the user's gaze and may identify the user's gaze region (e.g., the user's ROI) among a plurality of regions included in the display panel. Based on the gaze region of the user, the image generator 102 of the processor AP 101 may generate at least one third image 624 (corresponding to the third image 450 of FIG. 4, but not limited thereto) including a high frequency component of the user's gaze region image by applying a filter 440 to residual data 430 between pixel values of the second image 420 and pixel values of the first image 410 according to at least one example embodiment described with reference to FIG. 4 above, but not limited thereto. The image compression circuit Comp 601 may compress the third image 624 based on a desired and/or predetermined compression method and/or compression algorithm. The processor AP 101 may transmit the compressed third image and/or the background image 621 to the timing controller 111, etc.

The timing controller 111 may include a scaler 603, an image decompression circuit Decomp 605, and/or an adder 114, etc., but is not limited thereto. The timing controller 111 may receive the compressed third image and the background image 621 from the processor AP 101. The image decompression circuit Decomp 605 may generate a restored third image 632 by decompressing the compressed third image based on a desired and/or predetermined compression method and/or compression algorithm, etc. The scaler 603 may generate a scaled-up background image 631 by enlarging the background image 621 at a desired and/or predetermined magnification depending on and/or based on the output resolution of the display device, but the example embodiments are not limited thereto. The adder 114 may generate an output image 633 (e.g., a foveated image) by adding the scaled-up background image 631, including low-frequency components of the entire image, to the reconstructed third image 632, including high-frequency components of the user's gaze region image. Among the plurality of regions of the output image 633, the region corresponding to the user's gaze region (e.g., the user's ROI) 635 may be expressed in high resolution, and other regions of the output image 633 may be expressed in lower resolution, etc.

In FIG. 6, at least one example embodiment in which the processor AP 101 transmits the compressed third image to the timing controller 111 has been described, but is not limited thereto. For example, the processor AP 101 may transmit the third image itself to the timing controller 111 based on a communication interface between the processor AP 101 and the timing controller 111 and/or a function set in the display device, but the example embodiments are not limited thereto.

A processor of an image device according to at least one example embodiment may effectively reduce the amount of data being transmitted between the processor and the timing controller, and/or the amount of power consumed for data transmission and/or data processing by transmitting the high frequency component of the user's gaze region image and/or data obtained by compressing the high frequency component to the timing controller, etc.

Figure 7:
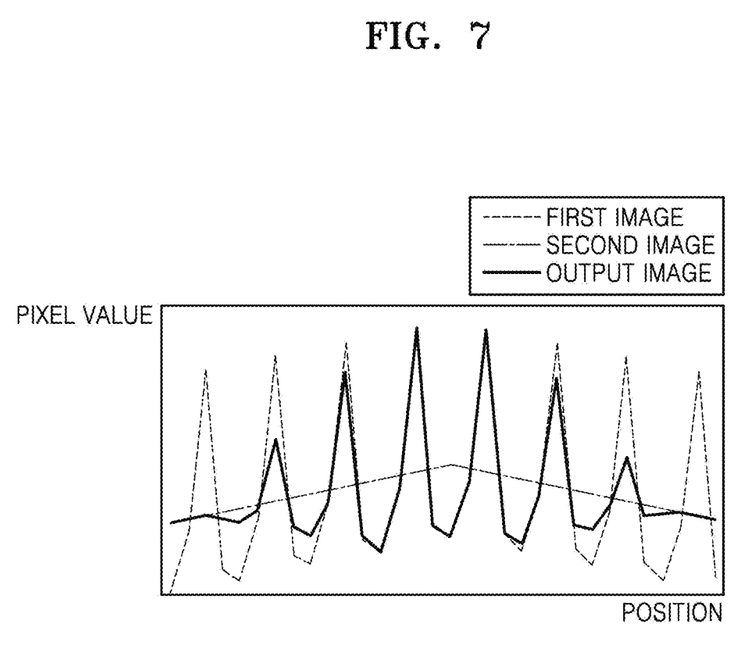
FIG. 7 illustrates an example of a user's gaze region image generated according to at least one example embodiment.

FIG. 7 illustrates an example of a user's gaze region image generated by the display device according to at least one example embodiment.

Referring to FIG. 7, FIG. 7 is a graph showing pixel values for each pixel position in the user's gaze region (e.g., the user's ROI) in the output image of the display device 200 of FIG. 2, but the example embodiments are not limited thereto. The horizontal axis represents a pixel location, and the vertical axis represents a pixel value, but the example embodiments are not limited thereto.

In at least one example embodiment, the first image is a high-resolution image corresponding to the user's gaze region (e.g., the user's ROI), and the size of a pixel value for each pixel position of the first image is generally greater than the size of a pixel value for each pixel position of the second image. Pixel values in the first image is variously changed for each position, and a range of variation of pixel values in the first image is much greater than a range of variation of pixel values in the second image, but the example embodiments are not limited thereto.

In at least one example embodiment, the second image is a low-resolution image corresponding to the user's gaze region (e.g., the user's ROI) in the scaled-up background image, and the size of the pixel value for each pixel position of the second image is generally less than the size of the pixel value for each pixel position of the first image, but is not limited thereto. Because pixel values in the second image hardly change by position, the range of variation of pixel values in the second image is small (and/or very small) compared to the range of variation of pixel values in the first image, but the example embodiments are not limited thereto.

In at least one example embodiment, the output image may be generated by subtracting the pixel value for each pixel position of the first image from the pixel value for each pixel position of the second image to obtain residual data according to some example embodiments, for example, described with reference to FIGS. 4 and 5, and adding a third image obtained by applying a weight to the obtained residual data to a scaled-up background image, but the example embodiments are not limited thereto. For pixels that are closer to the user's gaze region in the output image, a greater pixel value may be output by applying a greater weight to pixels positioned closer to the user's gaze region, etc. Conversely, pixels in regions other than the user's gaze region in the output image may be output with a smaller pixel value by applying lesser weight (e.g., smaller weight) as the distance from the user's gaze region among the positions of the pixels increases, but is not limited thereto. Accordingly, pixel values of the user's gaze region in the output image may be similar to pixel values of the first high-resolution image, and pixel values of other regions may be similar to pixel values of the low-resolution second image, etc. That is, the output image may be a foveated image in which the user's gaze region is output in high resolution and the rest of the background area is output in lower resolution. The boundary area between the user's gaze area and the rest of the background image may have a filter value which gradually decreases as the distance from the user's gaze region increases through weighted filtering, etc.

The display device according to at least one example embodiment may implement various types of boundary shapes adaptively according to and/or based on a display environment and/or a user's setting through filtering which extracts high-frequency components of the user's gaze region image and applies weights thereto. In addition, the display device according to at least one example embodiment may improve the performance of the display system by decreasing and/or preventing excessive and/or extraneous data processing, data transmission, and/or power consumption from occurring in the process of generating the foveated image by generating the foveated image through a comparatively simple calculation of a low-frequency component of a background image and a high-frequency component of an image of a user's gaze region.

Figure 8:
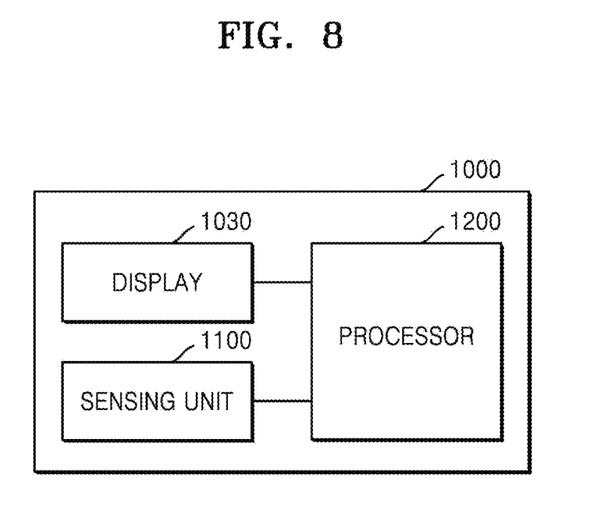
FIGS. 8 and 9 are block diagrams of wearable electronic devices according to at least one example embodiment.
Figure 9:
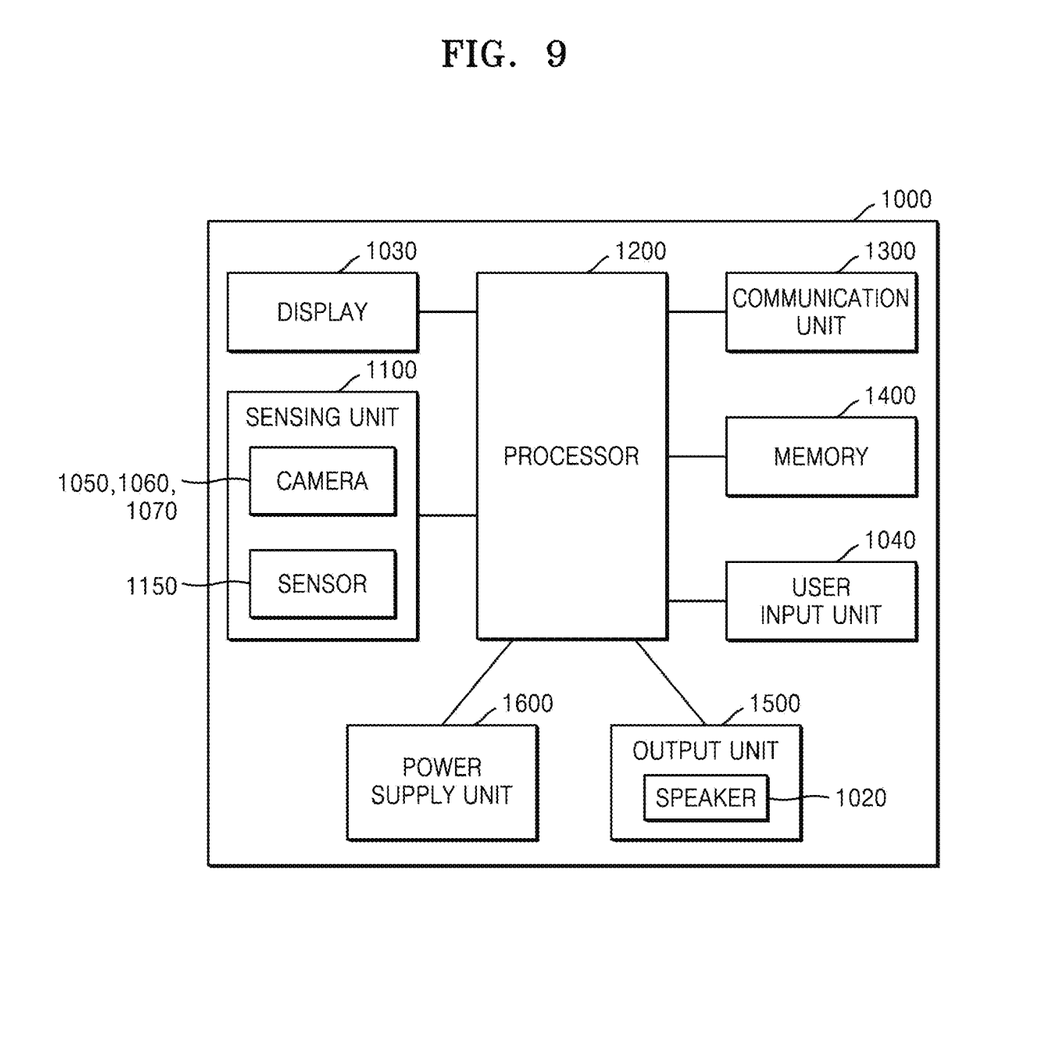

FIGS. 8 and 9 are block diagrams of wearable electronic devices according to at least one example embodiment.

Referring to FIG. 8, a wearable electronic device 1000 according to at least one example embodiment may include a sensing unit 1100 (e.g., at least one sensor, etc.), a processor 1200 (e.g., at least one processor), and/or a display 1030 (e.g., at least one display, etc.), etc., but is not limited thereto. However, the wearable electronic device 1000 may be implemented with more components than those shown in FIG. 7. In addition, each component included in the wearable electronic device 1000 may be disposed on a frame used to wear the wearable electronic device 1000 on the user's head, but the example embodiments are not limited thereto. The wearable electronic device 1000 of FIG. 8 may correspond to the display device 100 of FIG. 2, but the example embodiments are not limited thereto. According to some example embodiments, the sensing unit 1100 and/or the processor 1200 may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

In at least one example embodiment, the display 1030 displays an image to the user based on information processed by the wearable electronic device 1000. The display 1030 may display a foveated image in which a portion corresponding to the user's gaze region (e.g., the user's ROI) is implemented in comparatively high resolution and the other regions (e.g., regions of the image which are not the user's ROI) are implemented in comparatively low resolution, but the example embodiments are not limited thereto.

In addition, the display 1030 may generate and display the foveated image through, for example, an addition operation between a scaled-up (e.g., increased) background image including a low-frequency component of an entire image including a user's gaze region and at least one third image including a high frequency component of the user's gaze region, etc.

The sensing unit 1100 may obtain information about at least one user's body part and/or information about a user's gesture. The information about the user's body part may include an image of the body part, and the information on the user's gesture may include an image of a body part of the user making the gesture, but the example embodiments are not limited thereto.

For example, the sensing unit 1100 may obtain an image of the user's eye(s) and/or hand(s), etc. The sensing unit 1100 may sense the user's gaze based on a capture image of the user's eyes, but is not limited thereto, and for example, may sense the user's gaze based on, at least in part, gyroscopic sensor(s) included in the sensing unit 1100 which determine a three-dimensional direction towards which the user's head, body, and/or hand(s) are pointed, etc.

Based on the sensing result of the sensing unit 1100, the processor 1200 according to at least one example embodiment may identify the user's gaze region (e.g., the user's ROI) from among a plurality of regions included in a displayed image. The processor 1200 may generate a foveated image as at least one output image by extracting a high frequency component of the user's gaze region image based on the user's gaze region and adding the extracted high frequency component to a low frequency component of the entire image of the background image, etc.

Referring to FIG. 9, the wearable electronic device 1000 according to at least one example embodiment may further include a communication unit 1300, a memory 1400, a user input unit 1040, an output unit 1500, and/or a power supply unit 1600, etc., but the example embodiments are not limited thereto. According to at least one example embodiment, the sensing unit 1100 may include at least one camera, e.g., cameras 1050, 1060, and/or 1070, etc., and/or at least one sensor 1150, etc., but the example embodiments are not limited thereto. The various components described above may be connected to each other through at least one bus, but is not limited thereto.

The processor 1200 may control operations of the wearable electronic device 1000. For example, the processor 1200 may control the display 1030, the sensing unit 1100, the communication unit 1300, the memory 1400, the user input unit 1040, the output unit 1500, and the power supply unit 1600 by executing programs including computer readable instructions stored in the memory 1400. According to some example embodiments, the processor 1200, the sensing unit 1100, the communication unit 1300, the memory 1400, the user input unit 1040, the output unit 1500, and/or the power supply unit 1600 may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

In at least one example embodiment, the processor 1200 may control the sensing unit 1100 to identify a gaze region of the user by using sensing information on at least one body part (e.g., eye(s)) of the user. The processor 1200 may obtain residual data through a subtraction operation between the first image, which is the user's gaze region (e.g., user's ROI) image, and the second image, which is the scaled-up background image, and then may control the display 1030 to generate a third image through a filtering operation which applies a weight to the obtained residual data, etc. Here, the third image may include a high frequency component of the user's gaze region (e.g., the user's ROI), but is not limited thereto. The processor 1200 may control the display 1030 to generate an output image through an addition operation between the scaled-up background image including low-frequency components of the entire image and the third image, but the example embodiments are not limited thereto.

The cameras 1050, 1060, and 1070 capture objects in real space. Object images captured by the cameras 1050, 1060, and 1070 may be moving images (e.g., video) and/or continuous still images. The wearable electronic device 1000 may be, for example, a glasses-shaped device having a communication function and/or a data processing function, etc., but is not limited thereto. The camera 1050 facing the front of the user in the wearable electronic device 1000 worn by the user may capture an object in a real space.

In addition, the camera 1060 may photograph the user's eyes. For example, the camera 1060 facing the user's face in the wearable electronic device 1000 worn by the user may capture the user's eyes and/or other facial features, etc.

In addition, the camera 1070 for eye tracking may capture the user's eyes and/or other facial features, etc. For example, the eye tracking camera 1070 facing the user's face in the wearable electronic device 1000 worn by the user may track the user's gaze region (e.g., the user's ROI) by tracking at least one of the user's head pose, eyelids, and/or pupils, etc.

The sensor 1150 may sense a state of the wearable electronic device 1000 and/or a state around the wearable electronic device 1000 and may transmit the sensed information to the processor 1200, etc. For example, the sensor 1150 may obtain wearing state information related to and/or corresponding to the user is wearing the wearable electronic device 1000. For example, the sensor 1150 may include a geomagnetic sensor, an acceleration sensor, a gyroscope sensor, a proximity sensor, an optical sensor, a depth sensor, an infrared sensor, an ultrasonic sensor, and/or the like.

The communication unit 1300 may transmit/receive information desired and/or necessary for the wearable electronic device 1000 to display an image and adjust the displayed image with the device 2000, a peripheral device, and/or a server.

The memory 1400 stores information desired and/or necessary for the wearable electronic device 1000 to display at least one image and generate at least one foveated image, etc., but is not limited thereto. For example, the memory 1400 may temporarily store the third image including the background image and the high frequency component of the user's gaze region image before the addition operation, etc.

The user input unit 1040 receives at least one user's input for controlling the wearable electronic device 1000, etc. The user input unit 1040 may receive, for example, a touch input, an audio input, and/or a key input, etc., for the wearable electronic device 1000.

The power supply unit 1600 supplies power for the operation of the wearable electronic device 1000 to each component, etc. The power supply unit 1600 may include a battery (not shown) capable of charging and/or storing power, and may include a cable (not shown) and/or a cable port (not shown) capable of receiving power from an external source, etc.

The output unit 1500 outputs information received from the communication unit 1300, processed by the processor 1200, and/or stored in the memory 1400 in the form of at least one of light, sound, and/or vibration, etc. For example, the output unit 1500 may include at least one speaker 1020 which outputs audio data. In addition, the speaker 1020 may output sound signals related to functions performed by the wearable electronic device 1000 (e.g., call signal reception sound, message reception sound, and/or notification sound, etc.).

The wearable electronic device 1000 may be connected to at least one external device 2000 (e.g., wirelessly connected and/or connected through at least one wire to the at least one external device 2000) and may display at least one image on the display 1030 of the wearable electronic device 1000 by receiving information about at least one display image from the external device 2000, etc.

While various example embodiments of the inventive concepts have been particularly shown and described, it will be understood that various changes in form and details may be made therein without departing from the spirit and scope of the following claims.

What is claimed is:

1. A display device comprising:
   at least one sensor; and
   processing circuitry configured to,
   generate a first image based on a gaze region of a user tracked using the at least one sensor,
   generate a second image based on a desired section of a background image, the desired section corresponding to the gaze region on the background image,
   obtain residual data from the first image and the second image, the obtaining the residual data including subtracting pixel values of the first image from pixel values of the second image, and
   generate a third image based on the residual data, the generating the third image including performing filtering of the residual data by applying at least one desired weight to the residual data.

2. The display device of claim 1, wherein the processing circuitry is further configured to:
   generate an output image based on the background image and the third image.

3. The display device of claim 2, wherein the processing circuitry is further configured to:
   scale-up the background image, the scaling-up the background image including increasing a size of the desired section of the background image by a desired magnification factor; and
   generate the output image by adding the scaled-up background image to the third image.

4. The display device of claim 1, wherein the processing circuitry is further configured to:
   compress the third image to generate compressed data; and
   generate an output image based on the background image and the compressed data.

5. The display device of claim 4, wherein the processing circuitry is further configured to:
   decompress the compressed data into the third image;
   scale-up the background image, the scaling-up the background image including increasing a size of the desired section of the background image by a desired magnification factor; and
   generate the output image by adding the scaled-up background image to the third image.

6. The display device of claim 1, wherein a resolution of the second image is lower than a resolution of the first image.

7. The display device of claim 1, wherein
   the background image includes at least one low-frequency component of the first image; and
   the third image includes at least one high frequency component of the first image.

8. The display device of claim 1, wherein the processing circuitry is further configured to perform the filtering of the residual data by:
   applying a greater weight to a desired portion of the residual data as a distance between the desired portion of the residual data and the gaze region becomes closer.

9. A method of operating a display device, the method comprising:
   tracking, by processing circuitry, a user's gaze region;
   generating, by the processing circuitry, a first image corresponding to the gaze region, the first image having a first resolution;
   generating, by the processing circuitry, a second image based on a desired section of a background image, the desired section corresponding to the user's gaze region on the background image, the second image having a second resolution;
   obtaining, by the processing circuitry, residual data from the first image and the second image, the obtaining including subtracting pixel values of the first image from pixel values of the second image; and
   generating, by the processing circuitry, a third image based on the residual data, the generating the third image including performing filtering of the residual data by applying at least one desired weight to the residual data.

10. The method of claim 9, further comprising:
    generating, by the processing circuitry, an output image based on the background image and the third image.

11. The method of claim 9, further comprising:
    scaling up, by the processing circuitry, the background image, the scaling-up including increasing a size of the desired section of the background image by a desired magnification factor; and
    generating, by the processing circuitry, an output image by adding the scaled-up background image to the third image.

12. The method of claim 9, further comprising:
    generating, by the processing circuitry, compressed data by compressing the third image; and
    generating, by the processing circuitry, an output image based on the background image and the compressed data.

13. The method of claim 12, further comprising:
    decompressing, by the processing circuitry, the compressed data into the third image;

scaling up, by the processing circuitry, the background image, the scaling-up including increasing a size of the desired section of the background image by a desired magnification factor; and generating, by the processing circuitry, the output image by adding the scaled-up background image with the third image.

14. The method of claim 9, wherein the second resolution is lower than the first resolution.

15. The method of claim 9, wherein
the background image includes at least one low-frequency component of the first image; and
the third image includes at least one high frequency component of the first image.

16. The method of claim 9, further comprising:
applying, by the processing circuitry, a greater weight to a desired portion of the residual data as a distance between the desired portion of the residual data and the user's gaze region becomes closer.

17. A wearable electronic device comprising:
processing circuitry configured to,
identify a user's region of interest in an image displayed to the user,
generate a first image corresponding to the region of interest,
generate a second image based on a desired section of a background image, the desired section corresponding to the region of interest on the background image,
generate a third image based on residual data, the residual data generated by filtering pixel values of the first image from pixel values of the second image, and
generate an output image based on the background image and the third image.

18. The wearable electronic device of claim 17, wherein the processing circuitry is further configured to generate the output image by:
scaling-up the background image, the scaling-up the background image including increasing a size of the desired section of the background image by a desired magnification factor; and
adding the third image to the scaled-up background image.

19. The wearable electronic device of claim 17, wherein
the background image includes at least one low-frequency component of the first image; and
the third image includes at least one high frequency component of the first image.

20. The wearable electronic device of claim 17, wherein the processing circuitry is further configured to perform the filtering by:
applying at least one weight to a desired portion of the residual data, the at least one weight increasing based on a distance of the desired portion of the residual data and the region of interest becoming closer.

* * * * *